United States Patent [19]

Tamarkin

[11] 4,422,640
[45] Dec. 27, 1983

[54] VIDEO GAME CONTROL UNIT AND LAP BOARD HOLDER THEREFOR

[76] Inventor: Michael J. Tamarkin, 1610 S. Queen St., York, Pa. 17403

[21] Appl. No.: 395,138

[22] Filed: Jul. 6, 1982

[51] Int. Cl.³ .............................................. A63B 71/04
[52] U.S. Cl. .................................. 273/148 R; 108/25; 108/43; 273/DIG. 28
[58] Field of Search ........... 273/309, 148 R, DIG. 28; 108/25, 43; 200/6 A, 153 K

[56] References Cited

U.S. PATENT DOCUMENTS 2,670,260  2/1954  Watt ........................................ 108/43
3,917,275  11/1975  Alpher ................................. 273/237

Primary Examiner—Vance Y. Hum
Assistant Examiner—Leo P. Picard
Attorney, Agent, or Firm—Charles J. Long

[57] ABSTRACT

A lap board holder is provided for use with a video game control unit such as that sold under the trademark Atari and commonly called a joy-stick control; the holder comprises a base which rests on the player's legs, a shelf on which the player can rest his or her hands, and structure joining the base and shelf in such manner that the control unit is held tightly between them. Also provided is a video game control unit which embodies the critical features of the lap board holder. The invention allows operation of the video game for extended time with improved control and greatly reduced hand and arm fatigue.

6 Claims, 3 Drawing Figures

VIDEO GAME CONTROL UNIT AND LAP BOARD HOLDER THEREFOR

BACKGROUND OF THE INVENTION

1. Field of the Invention

This invention relates to video game control units. More particularly, the invention relates to control units for Atari * video games and to a lap board holder for such units which provides increased player comfort and control when operating the video game.

* Atari is a registered trademark of Atari, Inc.

2. Description of the Prior Art

Video games have become immensely popular in the last few years; perhaps the most popular of several available games are those sold under the Atari trademark. Control units supplied with Atari games include those known as "joy stick" controls. In a joy stick control unit, a control rod (the "joy stick") extends generally perpendicularly from the top surface of a generally box-shaped housing, which is about 3½ inches long, 3⅜ inches wide and 1½ inches high. In addition to the control rod, the top surface of an Atari joy stick control unit generally includes a control button. It should be understood that in this specification and the claims following, the term "box-shaped" means in the shape of a right rectangular prism.

In operating the joy stick controls, a player holds the housing in one hand, generally the left hand, in such manner that the control button can be activated by the thumb of that hand; the player uses his or her other hand to operate the joy stick itself—i.e., to move the control rod in various directions as necessary to play the particular game programmed into the unit.

A significant disadvantage of using the Atari joy stick control unit for extended periods of time, which is not uncommon, is that it often results in discomfort and even cramps in the player's hands, especially the hand holding the housing and operating the control button. Obviously, the game would be more relaxing and enjoyable if means could be found to eliminate the necessity of holding the housing in the player's hand while maintaining adequate control of the unit. To the best of my knowledge no such means have heretofore be available from either the video game art or any other area of the prior art. I have found that by mounting an Atari joy stick control unit in a suitable lap board holder as hereinafter described, the aforementioned problems with long-time use can be eliminated. Similar results can also be accomplished by providing a control unit which itself incorporates the features of my lap board holder.

SUMMARY OF THE INVENTION

In accordance with the invention I provide, for use with a video game control unit of the type wherein a control rod extends generally perpendicularly from the top surface of a generally box-shaped housing, which is up to about 6 inches long, up to about 6 inches wide, and up to about 3 inches high, a lap board holder comprising a rigid planar base having length at least sufficient to span and rest on the legs of a person operating the control unit while seated and width at least equal to the width of the housing, a rigid planar shelf having length exceeding the length of the control unit by an amount sufficient to provide support for at least one hand of a person operating the control unit and width at least equal to the width of the housing, the periphery of the shelf including a recess, and means joining the shelf to the base and positioning the shelf above the base in parallel spaced apart relationship such that the housing can be slid into position between the shelf and base and be held there by a tight fit with the control rod positioned in the recess in the shelf.

Preferably, the base and shelf are each of generally rectangular shape and the recess is formed in one of the longer sides of the shelf.

In a preferred embodiment the overall length and width of the base are 12 to 20 inches and 5 to 10 inches respectively.

In another preferred embodiment, the overall length and width of the shelf are 7 to 15 inches and 4 to 8 inches respectively.

In an embodiment especially adapted for the Atari joy stick control unit, I provide, for use with a video game control unit which includes (a) a generally box-shaped housing about 3½ inches long, about 3⅜ inches wide and about 1½ inches high having top and bottom surfaces, left and right sides, a front and a rear; (b) a control rod extending generally perpendicularly from the center of the top surface; and (c) a control button on the top surface, a lap board holder comprising a rigid planar base of generally rectangular shape having length of 15 to 18 inches and width of 6 to 8 inches; a rigid planar shelf of generally rectangular shape having length of 7 to 10 inches, width of 4 to 6 inches, and a recess in one of the long sides; and means joining the shelf to the base and positioning the shelf about 1½ inches above the base and parallel to the base whereby when the housing is slid into position between the base and shelf, it will be held in such position by a tight fit, wherein the recess is of such shape and size that when the housing is in position between the base and the shelf both the control rod and the control button are accessible to the hands of a person operating the control unit.

I may preferably provide a non-slip surface on the underside of the base of my lap board holder, whereby the holder will resist slipping when positioned on the legs of a person operating the unit.

I also provide a video game control unit comprising a housing in which a generally box-shaped body is positioned between and joined to a base and a top, both the base and the top being planar, rigid, generally rectangular, and at least as long and as wide as the body, and a control rod extending generally perpendicularly from the top of the housing, wherein the length of the base is at least sufficient to span and rest on the legs of a seated person operating the control unit, and the length of the top is sufficient to provide support for at least one hand of a person operating the control unit.

In my control unit, I prefer that the base be from about 12 to about 20 inches long and from about 5 to about 10 inches wide, and further that the top be from about 7 to about 15 inches long and from about 4 to about 8 inches wide.

As with my lap board holder, my control unit may have its underside provided with a non-slip surface, whereby the control unit will resist slipping when positioned on the legs of a seated person operating it.

Further details, objects and advantages of the invention will become apparent as the following description of certain present preferred embodiments thereof proceeds.

BRIEF DESCRIPTION OF THE DRAWINGS

In the accompanying drawings I have shown certain present preferred embodiments of the invention in which.

DESCRIPTION OF THE PREFERRED EMBODIMENTS

Figure 1:
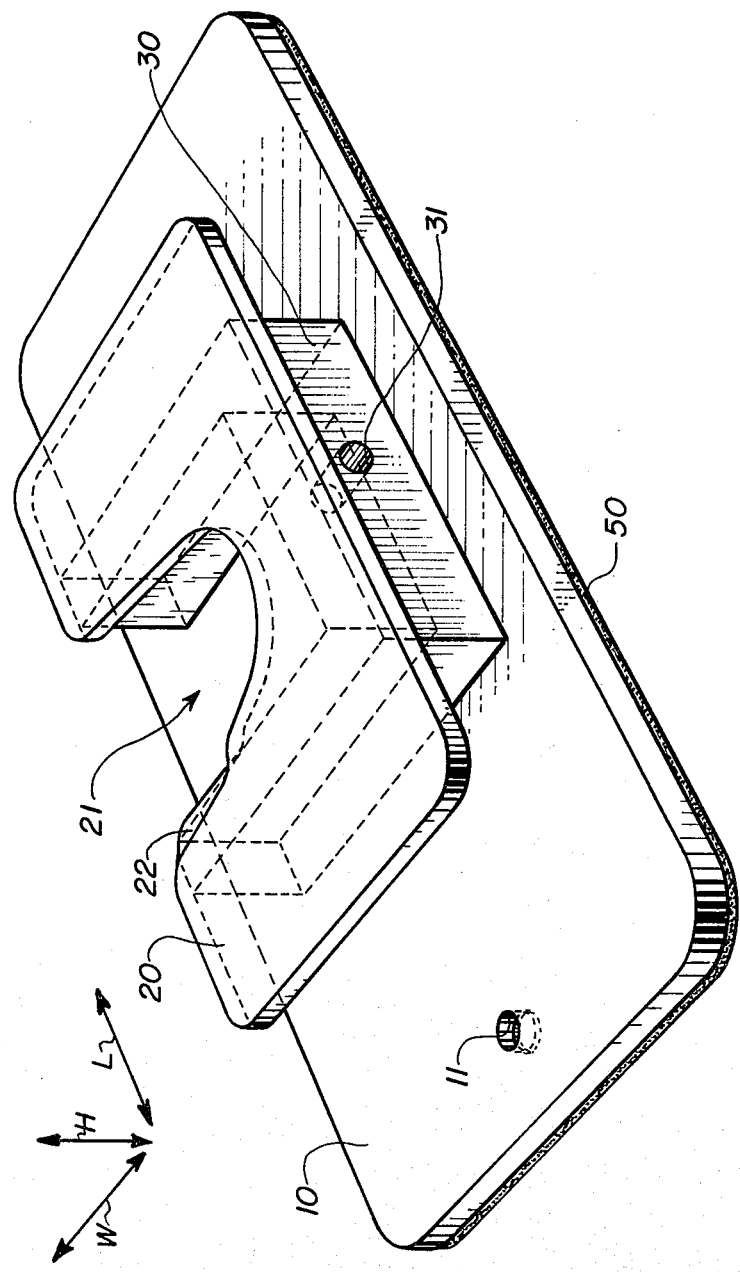
FIG. 1 is a top front three-quarter perspective view of my lap board holder.
Figure 2:
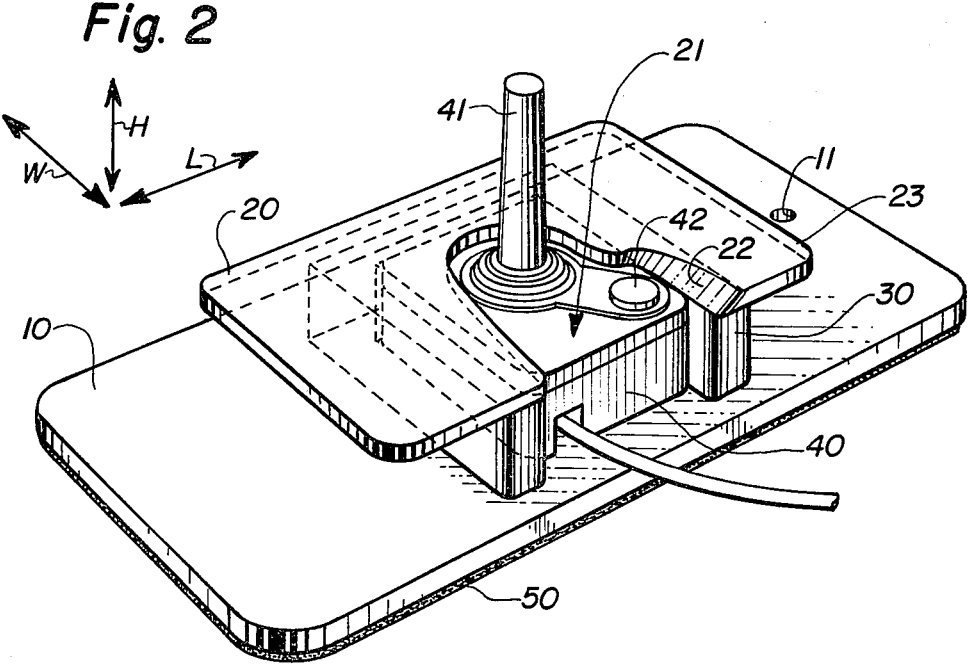
FIG. 2 is a top rear three-quarter perspective view of my lap board holder with an Atari control unit in position therein.

Turning first to FIGS. 1 and 2, wherein like numerals designate like features, it will be seen that my lap board holder includes a rigid planar base 10 and a rigid planar shelf 20, both of which are generally rectangular in shape. The preferred holder depicted in FIGS. 1 and 2 is especially adapted for use with the Atari joy stick control unit, which includes a generally box-shaped housing 40 having approximate dimensions of $3\frac{1}{2}$ inches long, $3\frac{7}{8}$ inches wide, and $1\frac{1}{2}$ inches high. In all the drawing figures, the directions for measuring length, width and height are shown by arrows L, W and H respectively.

With regard to the base 10, I have found that for best results it must be at least as wide as the housing 40 and at least long enough to span and rest upon the legs of a seated person operating the control unit. To meet these requirements the base of my holder is 5 to 10 inches, preferably 6 to 8 inches wide and 12 to 20 inches, preferably 15 to 18 inches long. The length and width can be greater than the broad ranges given, but above such ranges the holder becomes somewhat cumbersome. In one embodiment, I use a base which is about 7 inches wide and about 17 inches long. The height, or thickness, of the base 10 is at least great enough to make the base rigid, and as such depends on the material used for the base. Wood, plastic, metal or like materials may be used satisfactorily for the base; in the holder shown in FIGS. 1 and 2 I may use wood having thickness of $\frac{1}{2}$ inch. The base may also include a hole 11 at one end for hanging the holder on, e.g., a nail when not in use.

The shelf 20 is dimensioned so as to be at least as wide as the housing 40 and long enough to support at least one hand of a person operating the control unit. I have found that widths of 4 to 8 inches, preferably 4 to 6 inches, and lengths of 7 to 15 inches, preferably 7 to 10 inches, are especially suitable for holders according to the invention, although dimensions exceeding such ranges could also be used satisfactorily. In one embodiment, the shelf is about 5 inches wide and about $7\frac{3}{4}$ inches long, which length both provides support for either hand of the player and allows gripping of the shelf. As with the base, the shelf may be formed from wood, plastic, metal or the like, so the height, or thickness required for rigidity will depend on the material chosen; I have found that lucite, plexiglass or other clear plastic having thickness of about $\frac{1}{4}$ inch is especially desirable for the shelf.

The shelf 20 includes a recess 21 in one of its long sides. The recess is so shaped and sized that when the Atari control unit housing 40 is in place in the holder, as shown in FIG. 2, both the joy stick or control rod 41 and the control button 42 are accessible to the hands of a person operating the control unit. The edge of the recess may be beveled at the control button side, as shown at 22, to minimize irritation of the operator's thumb or finger when operating the button. I have found that the length from control button 42 to the shelf end 23 nearest the button should preferably be no more than about $2\frac{3}{4}$ inches; this allows most players to have the fingers of their hand around shelf end 23 and to reach control button 42 with their thumb without stretching.

Means, designated generally as 30, join the shelf 20 to the base 10 in parallel spaced apart relationship such that the housing 40 can be slid into position between the shelf and base and be held there by a tight fit with the shelf recess oriented as discussed above. In the embodiment shown in FIGS. 1 and 2, such means comprise a generally U-shaped member formed of $\frac{3}{4}$ inch thick wood which, when the base and shelf are joined thereto, defines an interior cavity about $3\frac{1}{2}$ inches long, about 4 inches wide and of such height as to provide a tight fit for the housing when the housing is slid into the cavity. For the Atari joy stick control unit, I have found that a height of $1\frac{1}{2}$ inches between base and shelf is ordinarily suitable, but it will be understood that slight differences from such height may be necessary if the housing height varies from one control unit to another. The U-shaped joining means 30 may be fastened to the base 10 and shelf 20 by glue, screws, or similar fastening means. The rear wall of the joining member 30 includes a hole 31 through which a pencil or the like can be inserted to push the tightly fitting housing from the holder when removal of the housing is desired. It will be understood that joining means other than that shown in FIGS. 1 and 2 may be used to join the shelf to the base and to position the two members—for example, a series of screws or bolts and nuts could serve satisfactorily as joining means—so long as the above-discussed requirements of parallel spaced apart relationship between shelf and base and a tight fit for the control unit housing are met.

The lap board holder of FIGS. 1 and 2 is, as its name implies, primarily intended to rest on the legs of a seated person operating the video game; however, it can of course also be placed on a table or other flat surface. To minimize slipping of the holder when in use, whether on a player's lap or elsewhere, a non-slip surface 50, which may be foam rubber, carpeting or the like, is applied to the underside of the base 10.

To use the lap board holder, the control unit housing 40 is slid into position between shelf 20 and base 10. The player ordinarily positions the holder so that the open side of recess 21 is away from him or her, places the holder across his or her lap and operates the joy stick control rod 41 with the right hand and the control button 42 with the left thumb.

Figure 3:
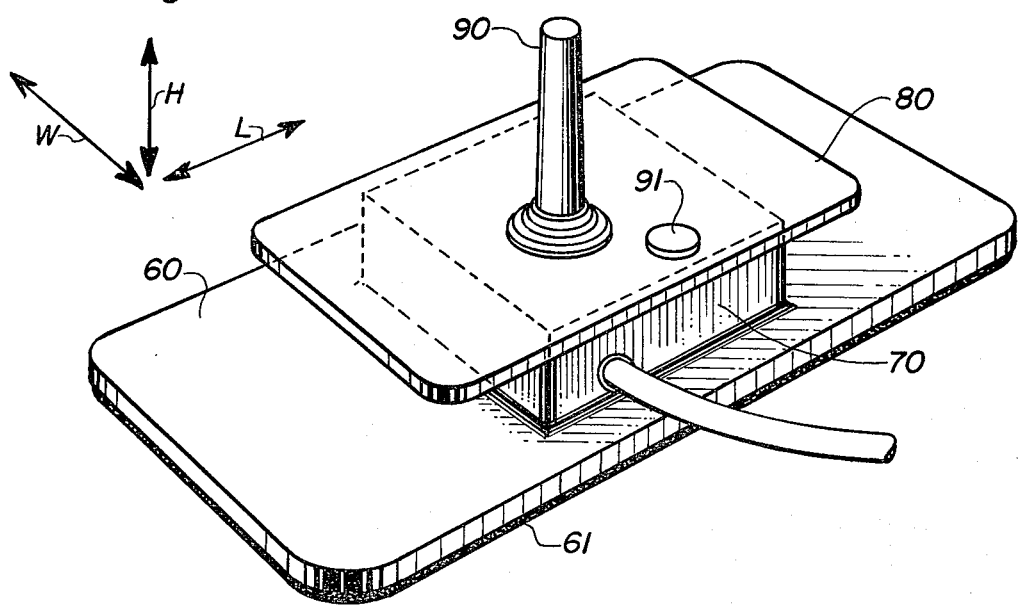
FIG. 3 is a top rear three-quarter perspective view of an alternative embodiment of the invention wherein the control unit itself is constructed to incorporate the essential features of the lap board.

In FIG. 3 the novel features of the holder of FIGS. 1 and 2 have been incorporated into the video game control unit itself. This, of course, provides an alternative means of achieving the objects of the holder; whereas the holder of FIGS. 1 and 2 is useful to those who already have control units of existing designs, the unit of FIG. 3 is more appropriate as original equipment supplied with the video game.

The control unit of FIG. 3 includes a housing made up of base 60, a generally box-shaped body 70 and top 80. The shapes and dimensions of base 60 and top 80 are substantially the same as those of base 10 and shelf 20, respectively, of FIGS. 1 and 2. The unit shown in FIG. 3 is intended as a replacement for the Atari joy-stick control units available heretofore, and accordingly it includes control rod 90 extending from the top and control button 91 adjacent to the control rod. As with the lap board holder of FIGS. 1 and 2, the unit of FIG. 3 also includes a non-slip surface 61 applied to the underside of base 60.

Use of my lap board holder with the Atari joy stick control unit, or use of the control unit incorporating the essential features of the lap board holder, results in significantly less hand discomfort for persons playing the Atari video game, especially for extended periods of time; moreover, because of its stability and size my holder provides improved control of play by the operator.

While I have shown and described certain present preferred embodiments of the invention, it is to be distinctly understood that the invention is not limited thereto, but may be otherwise variously embodied within the scope of the following claims.

I claim:

1. A lap board holder for supporting a video game control unit of the type wherein a control rod extends generally perpendicularly from the top surface of a generally box-shaped housing which is up to about 6 inches long, up to about 6 inches wide and up to about 3 inches high, comprising:
   a rigid planar base having length at least sufficient to span and rest on the legs of a person operating the control unit while seated and width at least equal to the width of the housing;
   a rigid planar shelf having length exceeding the length of the control unit by an amount sufficient to provide support for at least one hand of a person operating the control unit and width at least equal to the width of the housing, the periphery of the shelf including a recess; and
   means joining the shelf to the base and positioning the shelf above the base in parallel spaced apart relationship such that the housing can be slid into position between the shelf and base and be held there by a tight fit with the control rod positioned in the recess in the shelf.

2. A lap board holder as claimed in claim 1 in which the base and shelf are each of generally rectangular shape and the recess is formed in one of the longer sides of the shelf.

3. A lap board holder as claimed in claim 2 in which the overall length and width of the base are 12 to 20 inches and 5 to 10 inches respectively.

4. A lap board holder as claimed in claim 3 in which the overall length and width of the shelf are 7 to 15 inches and 4 to 8 inches respectively.

5. A lap board holder for supporting a video game control unit which includes (a) a generally box-shaped housing about 3½ inches long, about 3⅝ inches wide and about 1½ inches high having top and bottom surfaces, left and right sides, a front and a rear; (b) a control rod extending generally perpendicularly from the center of the top surface; and (c) a control button on the top surface, a lap board holder comprising:
   a rigid planar base of generally rectangular shape having length of 15 to 18 inches and width of 6 to 8 inches;
   a rigid planar shelf of generally rectangular shape having length of 7 to 10 inches, width of 4 to 6 inches, and a recess in one of the long sides; and
   means joining the shelf to the base and positioning the shelf about 1½ inches above the base and parallel to the base whereby when the housing is slid into position between the base and shelf it will be held in such position by a tight fit, wherein the recess is of such shape and size that when the housing is in position between the base and the shelf, both the control rod and the control button are accessible to the hands of a person operating the control unit.

6. A lap board holder as claimed in any of claims 1, 2, 3, 4 or 5, in which the underside of the base is provided with a non-slip surface whereby the holder will resist slipping when positioned on the legs of a person operating the control unit.

* * * * *